Feb. 3, 1953            G. M. STONE            2,627,346

DISCHARGE DEVICE FOR CAN WEIGHING MACHINES

Filed March 30, 1950            4 Sheets-Sheet 1

INVENTOR.
GEORGE M. STONE
BY *Charles H. Erne*
*Ivan D. Thornburgh*
ATTORNEYS

Feb. 3, 1953 G. M. STONE 2,627,346
DISCHARGE DEVICE FOR CAN WEIGHING MACHINES
Filed March 30, 1950 4 Sheets-Sheet 2

INVENTOR.
GEORGE M. STONE
BY Charles H. Cine
Ivan D. Thornburgh
ATTORNEYS

Feb. 3, 1953  G. M. STONE  2,627,346
DISCHARGE DEVICE FOR CAN WEIGHING MACHINES
Filed March 30, 1950  4 Sheets-Sheet 4
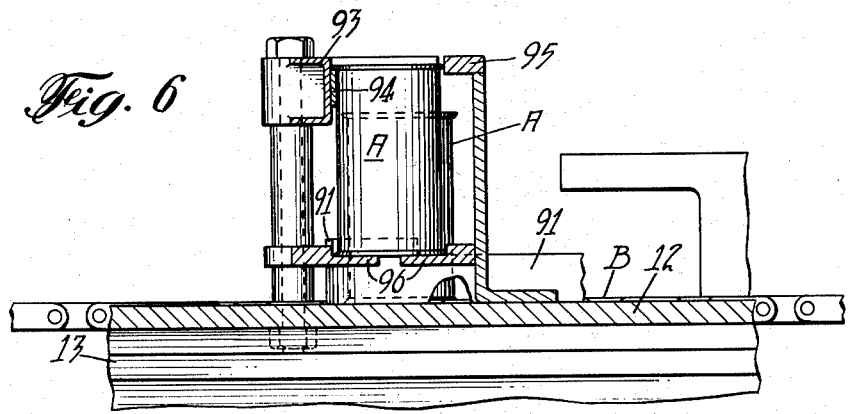
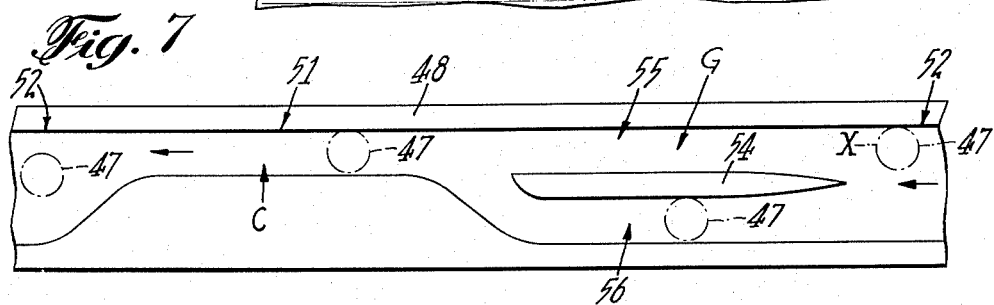
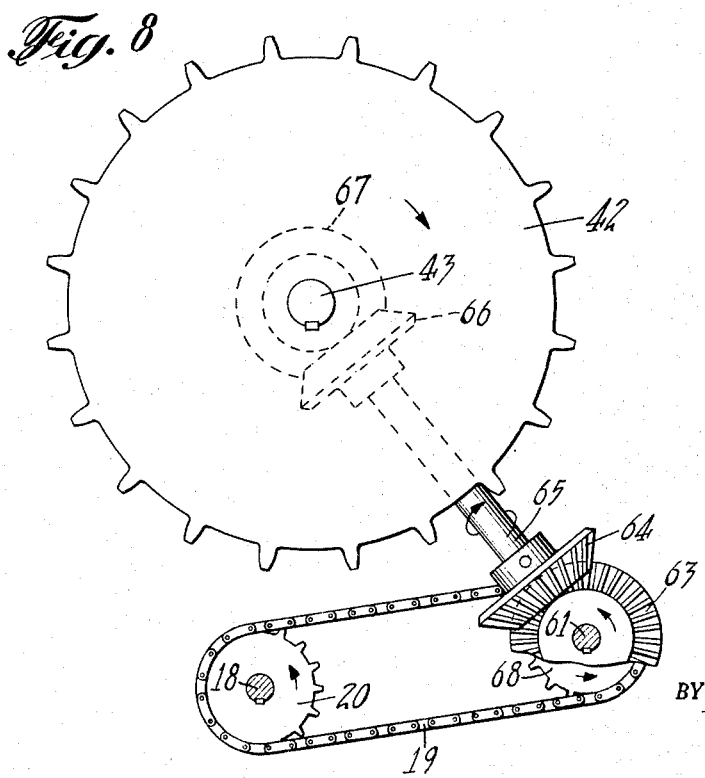
INVENTOR.
GEORGE M. STONE
BY Charles H. Eime
Ivan D. Thornburgh
ATTORNEYS Patented Feb. 3, 1953

2,627,346

UNITED STATES PATENT OFFICE 2,627,346

DISCHARGE DEVICE FOR CAN WEIGHING MACHINES

George M. Stone, Westfield, N. J., assignor to American Can Company, New York, N. Y., a corporation of New Jersey Application March 30, 1950, Serial No. 152,899

8 Claims. (Cl. 209—74)

The present invention relates to machines for weighing and sorting articles such as for example, filled cans or containers and has particular reference to a multiple level discharge turret for separating full-weight cans from lightweight cans.

An object of the invention is the provision in a can weighing and sorting machine of a discharge turret wherein separation of the light-weight cans from the full-weight cans is effected simultaneously with the discharging of the cans from the machine, both operations being brought about by the same turret.

Another object is the provision of such a discharge turret wherein full-weight cans are discharged at one level and lightweight cans at another level so as to discharge the cans into two different non-interfering runways served by the same discharge turret.

Another object is the provision of such a discharge turret wherein the turret embodies support elements for supporting a can at a certain level in accordance with the weight of the can and the level it assumes during the weighing operation to facilitate separation of lightweight cans from full-weight cans.

Numerous other objects and advantages of the invention will be apparent as it is better understood from the following description, which, taken in connection with the accompanying drawings, discloses a preferred embodiment thereof.

Referring to the drawings:

Fig. 6 is a sectional view taken substantially along the line 6—6 in Fig. 2, with parts broken away;

Fig. 7 is a developed schematic elevational view of a fragment of a cam used in the machine, and Fig. 8 is a top plan view showing the manner of driving various parts of the machine.

Figure 1:
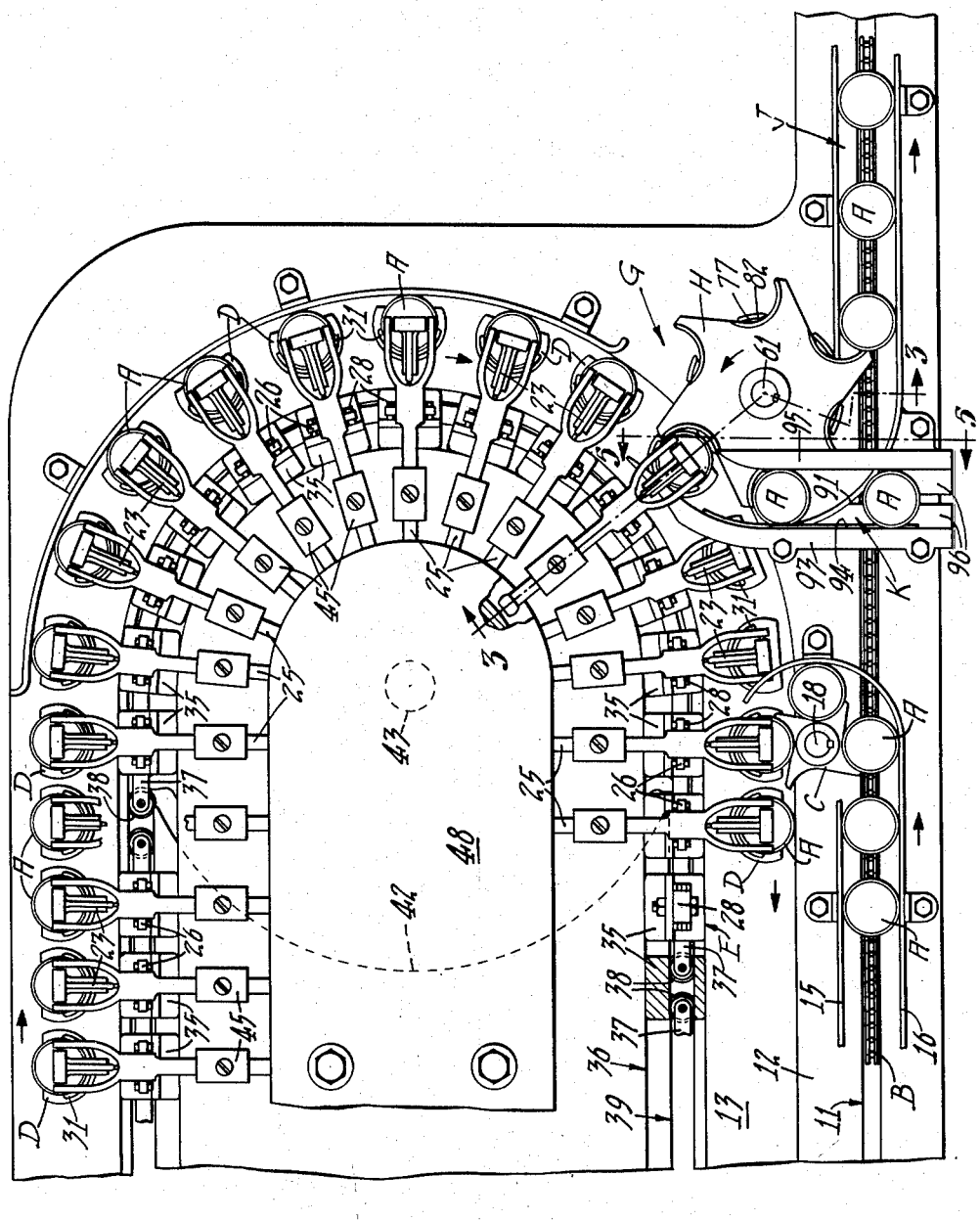
Figure 1 is a fragmentary top plan view of a machine embodying the instant invention.
Figure 2:
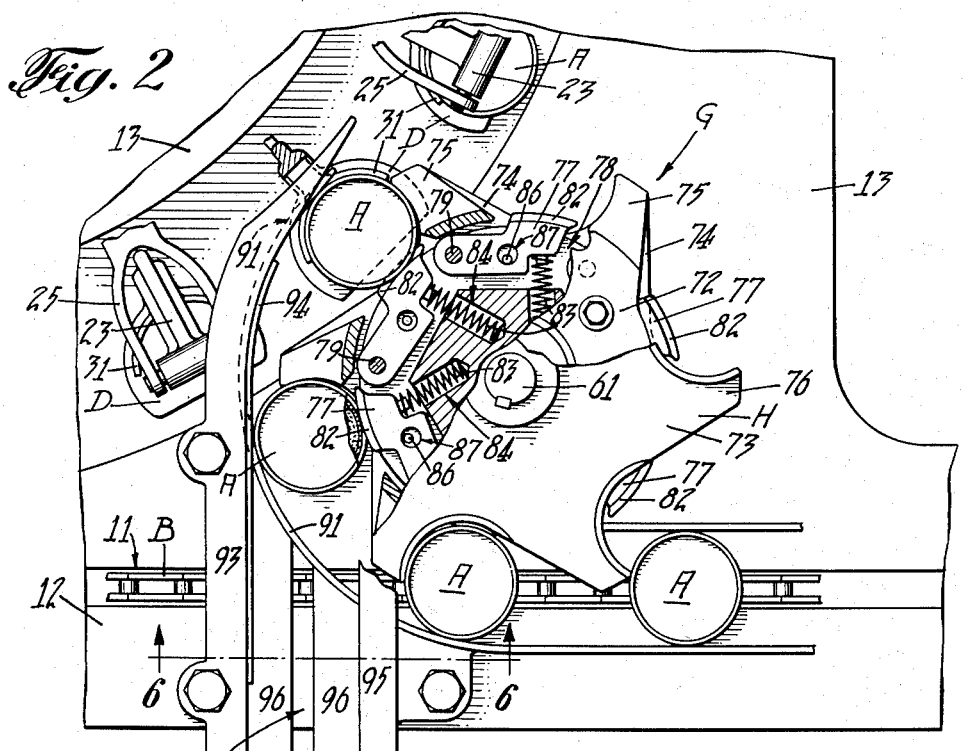
Fig. 2 is an enlarged fragmentary top plan view of the discharge portion of the machine located at the right in Fig. 1, with parts being shown in section.

As a preferred or exemplary embodiment of the instant invention the drawings illustrate principal parts of a can weighing and sorting machine of the character disclosed in United States Patents 2,098,260, issued November 9, 1937, to W. R. Smith, and 2,266,807, issued December 23, 1941, to W. E. Rooney. In such a machine filled cans A (Fig. 1) enter in a continuous procession on a feed chain B and are picked off individually in spaced and timed order by a star wheel C and transferred to scale pans D propelled along an oblong endless path of travel by a weighing conveyor E. As a scale pan D moves past the feed-in star wheel C, the pan is held rigid to receive the can and is thereafter released to float vertically in accordance with the weight of the received can. If the can is of full weight, the can and its scale pan settles to a predetermined level and remains there. If the can is underweight, the can and its scale pan rises to a level above the full-weight can level in accordance with the lightness of the can. This seeking by the can of its weight level is a slow operation and is effected while the scale pan moves along the major portion of its path of travel.

At a discharge station G disposed adjacent the path of travel of the scale pans D, the lightweight cans A are separated from the full-weight cans and it is to this feature that the instant invention is particularly directed. The separation of the cans is effected simultaneously with their discharge from the machine by a single two level discharge turret H which effects both operations of separating and discharging the cans in accordance with the level of a can as it enters the discharge station. For this purpose, each scale pan D as it approaches the discharge station G is locket against vertical movement at one of two levels, a full-weight can lower level or a light-weight can higher level.

Hence the can, as determined by its weight, is engaged by the discharge turret at one of the two levels and is either directed into a full-weight can discharge runway J or a higher level and differently directed lightweight can discharge runway K, devices in the turret and in the runways being provided to fully support the can at its received level for discharge into its proper runway without interference with the other runway.

Referring now to the drawings in more detail, it will be observed that the feed chain B operates in a groove 11 (Fig. 1) formed in the top of a horizontal table 12 provided on a frame 13 which constitutes the main frame of the machine. The feed chain extends the full length of the machine, passing through the can feed-in and discharge portions of the machine and is actuated continuously by suitable sprockets housed in the frame 13 as disclosed in the above mentioned Smith Patent 2,098,260. Guide rails 15, 16 disposed adjacent the feed chain B keep the advancing cans in line.

The can feed-in star wheel C is disposed adjacent the feed chain B at the terminal ends of the guide rails 15, 16 and is carried on the upper end of a vertical drive shaft 18 journaled in suitable bearings formed in the main frame 13 as shown in the Smith patent. The shaft preferably is driven by an endless chain 19 (Fig. 8) which operates over a sprocket 20 secured to the lower end of the shaft and which is driven from and in time with the discharge turret H as will be hereinafter more fully explained.

The scale pans D which receive the cans A from the star wheel C, are parts of traveling scale units mounted on parallelogram systems of arms which permit of substantially vertical movement of the scale pans and the cans carried thereon as shown in the Rooney Patent No. 2,266,807 above mentioned. For this purpose, each scale pan D extends outwardly in a substantially horizontal position, from an upright arm 23 (Fig. 3) which at its upper end curves outwardly and terminates above the center of the scale pan D in spaced relation thereto to permit of the reception of a can A on the pan.

Figure 3:
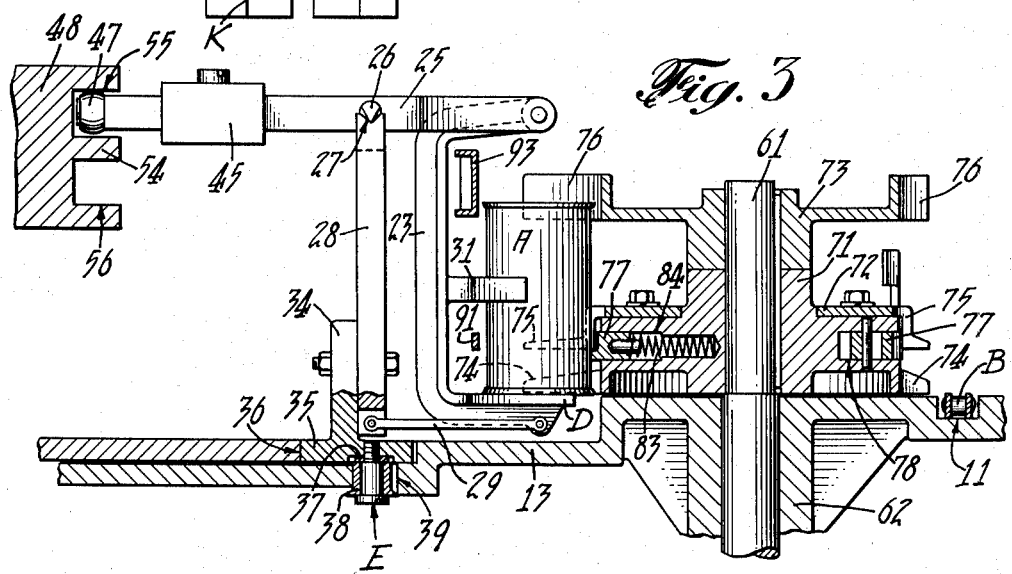
Fig. 3 is an enlarged sectional view taken substantially along the broken line 3—3 in Fig. 1, with parts broken away.

The upper terminal end of the vertical arm 23 is pivotally connected to the outer bifurcated end of a substantially horizontal balance beam 25 (Fig. 3). Intermediate its ends the balance beam is provided with trunnions 26 having anti-friction knife edges which rest in V-shaped seats 27 in the upper ends of an upright bifurcated support bracket 28. Adjacent the lower end of the bracket, the scale pan D is pivotally connected thereto by a link 29, the ends of which are pivotally connected to the bracket and to the pan as best shown in Fig. 3. This link completes the parallelogram system which supports and controls the movement of the scale pan. A fixed cradle 31 secured to the arm 23 extends outwardly over the scale pan D and holds a can in place on the pan.

There is one support bracket 28 for each scale pan D and these brackets adjacent their lower ends are secured to upright lugs 34 which extend up from spaced slide blocks 35 which slide in a horizontal groove 36 formed in the top of the machine frame 13. The blocks 35 are pivotally connected by links 37 (see also Fig. 1) and taken together constitute the weighing conveyor E, details of which are disclosed in the above mentioned Smith and Rooney patents.

Actuating and guide rollers 38 depending from the slide blocks 35 operate in a guiding slot 39 in frame 13 and at the ends of the machine operate over a conveyor driving sprocket 42 (see also Fig. 8) and an idler sprocket at the opposite end not shown. The driving sprocket 42 is mounted on a vertical shaft 43 journaled in the main frame 13 and rotated in any suitable manner, preferably as disclosed in the above mentioned Smith and Rooney patents.

The balance beam 25 intermediate its inner end and its balancing trunnions 26, carries an adjustable counterbalance weight 45 to counterbalance the weight of the scale pan D and its supporting arm 23 and link 29. The inner end of the beam carries a cam roller 47 which operates in a track of a stationary cam 48 (Figs. 1, 3, 4 and 7) secured to main frame 13 and disposed inwardly of and adjacent the path of travel of the weighing conveyor E. As best shown in Fig. 7, the cam 48 is formed with a narrow track section 51 disposed adjacent the top of the cam and located in the cam directly opposite the feed-in star wheel C. This section 51 of the cam track is just wide enough to confine the cam roller 47 of a scale pan D at an elevation which holds the scale pan flush with the top of the table 12 as the scale pan passes the star wheel C to permit transfer of a can A from the table to the scale pan.

Beyond the star wheel C to the left of Figs. 1 and 7, the narrow cam track section 51 merges into a considerably wider track section 52 which extends annularly around the cam 48 for the major portion thereof. This wide cam track section 52 is of sufficient width to permit the cam roller 47 to float vertically in accordance with the weight of the can received on the scale pan and to come to rest before it reaches the discharge station G. If the can A is a full-weight can, the balance beam 25 will assume a position such as shown in Fig. 3 and its cam roller 47 will ride adjacent the upper edge of the wide cam track section 52 as indicated by the roller X shown in dotted lines in Fig. 7. If the can A is a lightweight can, the balance beam 25 will rock in a counterclockwise direction as viewed in Fig. 4, and permit the cam roller 47 to assume a position near the lower edge of the track section 52 or a position somewhere between the upper and lower edges depending upon the lightness of the can.

As a scale pan D with its can A approaches the discharge station G, the balance beam cam roller 47 is locked in one of two positions by engagement with a locking projection or divider rail 54 (Fig. 7) which extends out from the cam in the track section 52 midway between its upper and lower edges. This projection divides the wide track section 52 into two narrow track sections 55, 56 respectively disposed adjacent the upper and lower edges of the track section 52. These sections 55, 56 are just wide enough to confine the cam roller 47 against vertical displacement while passing through the discharge station G. The leading edge of the projection 54 is tapered so as to direct the cam roller 47 into one or the other of the locking sections 55, 56 in accordance with the degree of lightness of the can.

Figure 4:
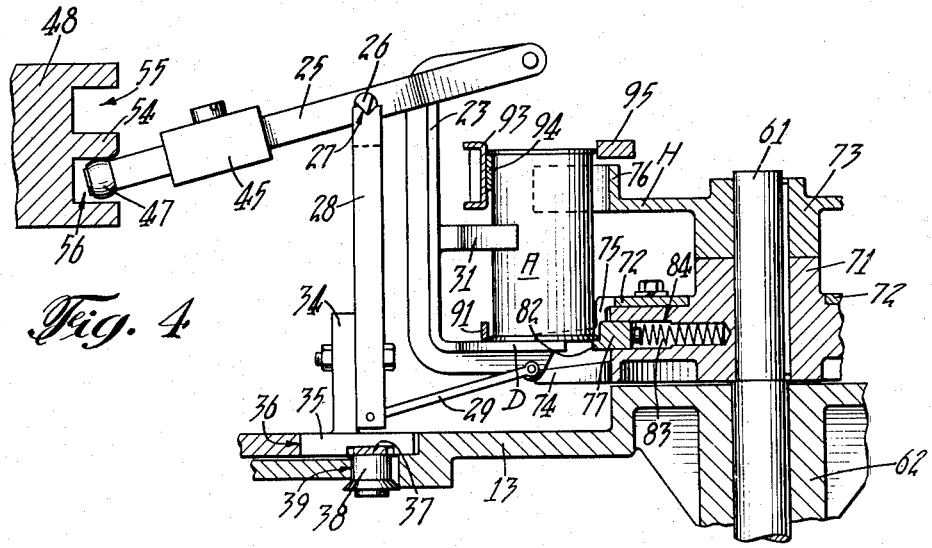
Fig. 4 is a view similar to Fig. 3 showing certain of the parts in a different position.

For a full-weight can, or one within an allowable degree of lightness, the cam roller 47 will be directed into the upper locking section 55 and through its balance beam 25, will hold the scale pan D and its can A in a position as shown in Fig. 3. For a lightweight can, beyond the allowable limit, the cam roller 47 will be directed into the lower locking section 56 and through its balance beam 25, will hold the scale pan D and its can A in an elevated position, as shown in Fig. 4.

When a can A in either of the above outlined positions enters the discharge station G, it is immediately engaged by the discharge turret H for discharge from the machine. This turret is mounted in a horizontal position adjacent the path of travel of the scale pans D as best shown in Fig. 1 and is carried on the upper end of a vertical shaft 61 (Figs. 1, 2, 3, 4 and 8) journaled in bearings 62 formed in the machine frame 13.

Adjacent its lower end the shaft 61 carries a bevel gear 63 which meshes with a bevel gear 64 carried on the outer end of a cross shaft 65 journaled in the machine frame. The inner end of the cross shaft 65 carries a bevel gear 66 which meshes with a bevel gear 67 mounted on the sprocket drive shaft 43. Through this gear connection, the discharge turret H is driven in time with the weighing conveyor E as hereinbefore mentioned. In a similar manner the actuating chain 19 of the feed-in star wheel C is driven by a sprocket 68 carried on the discharge turret H and thus the star wheel C, is driven in time with the conveyor E and the turret H.

The discharge turret H preferably is made in three parts for easy manufacture and comprises a main turret body 71 having a turret ring 72 superimposed thereon and an auxiliary turret disc 73, the body 71 and the disc 73 being keyed to the turret shaft 61. The turret body 71, the ring 72 and the disc 73 are formed with a plurality of spaced feed fingers 74, 75, 76 respectively which are in alignment vertically for engagement behind a can A on a scale pan D for removal of the can from the scale pan. The main turret body 71 is further provided with horizontally disposed supporting elements, fingers or levers 77 which are located in a groove 78 formed in the body around its circumference.

There is one support lever 77 for each set of vertically aligned feed fingers 74. One end of the levers is mounted on pivot pins 79 secured in the turret body. The opposite end of the levers is located adjacent the turret feed fingers 74 and is formed with a shelf 82 which projects beyond the outer periphery of the turret body and which is located vertically in a plane with the top of a scale pan D locked in position for a lightweight can. The shelf ends of the support levers 77 are backed up by compression springs 83 located in bores 84 in the turret body and interposed between the bottoms of these bores and the levers. Stop pins 86 secured in the turret body 71 and projecting up into enlarged holes 87 in the levers 77 limit the outward travel of the levers under the force of the compression springs 83.

Hence when a scale pan D carrying a full-weight can A and locked in position by the upper cam track section 55 of the cam 48, moves into the discharge station G, as shown in Fig. 3, the turret fingers 74, 75, 76 engage behind the can and sweep it off the scale pan D at a level which is flush with the table 12 of the machine. As the turret fingers move into engagement with the can, the can presses the associated support lever 77 back into an out of the way position in its groove 78 against the resistance of its spring 83.

During this removal of the full weight can from the scale pan D, the can is guided by a curved guide rail 91 which is disposed adjacent the outer periphery of the turret and which extends across and in back of the path of travel of the scale pans D for assisting in sweeping the full weight cans off the pans. The guide rail 91 directs the removed full-weight cans A back onto the feed chain B for advancement of the cans by the chain to any suitable place of deposit. For this purpose the discharge turret H preferably is located adjacent the feed chain B as best shown in Fig. 1.

When a lightweight can A moves into the discharge station G, its scale pan D is locked in an elevated position by the lower track section 56 of the cam 48 as shown in Fig. 4. In this position of the can, the shelf portion 82 of the adjacent spring pressed support lever 77 moves into position under the elevated lightweight can A as the turret fingers 75, 76 engage against the can, and thus the shelf 82 supports the can at its bottom and maintains it in its elevated position as the fingers sweep the can off the scale pan D (see Figs. 2 and 4). The can in this elevated position is above and out of contact with the guide rail 91.

During this removal of the can, it is guided by a guide rail 93 which is spaced above the curved guide rail 91 and which extends outwardly substantially at right angles to the path of travel of the feed chain B. The inner end of this guide rail 93 is curved slightly to engage behind the can and assist in its removal from the scale pan.

The inner face of the guide rail 93 is formed with a step or ledge 94 for engagement under the upper projecting end seam or ledge of the can being removed to help support the can as it is swept off the scale can (see Fig. 6). An oppositely disposed guide rail 95 located at a level with the ledge 94 holds the upper end of the can against the ledge.

Figure 5:
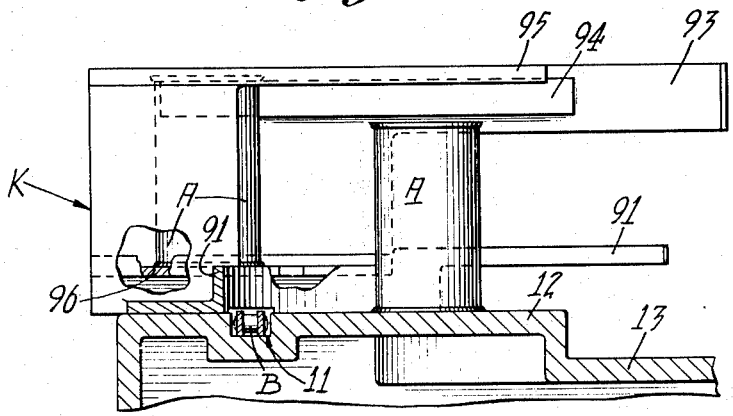
Fig. 5 is an enlarged sectional view taken substantially along the line 5—5 in Fig. 1, with parts broken away.

Thus with the lightweight can supported on the shelf 82 of the support lever 77 and the ledge 94 of the guide rail 93, it retains its elevated position and as it is advanced by the turret fingers 75, 76 it readily passes over the top of the full-weight can guide rail 91 and enters the elevated chute or runway K (see Figs. 5 and 6), the rail 91 being reduced in height at this point to permit this pass over. This chute is provided with a floor 96 which is flush with the top edge of the full-weight can guide rail 91 and which carries the discharge lightweight can to any suitable place of deposit separated from the full-weight cans.

It should be understood, that if desired, a plurality of the support levers or fingers 77 could be readily arranged one above the other, for use with or without an appropriate cam 48, to support cans A at whatever level they could assume, within predetermined ranges, during the discharge of the cans at these levels from the scale units.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can weighing and sorting machine, the combination of a scale unit having free vertical movement to assume relative vertical positions at different levels according to the weight of a can received thereon, a rotatable discharge turret disposed adjacent said scale unit for removing the weighed can therefrom at a level determined by the can weighing level, a plurality of discharge means disposed adjacent said turret and located at different levels for receiving the weighed cans from said turret at their predetermined levels, and a yieldable finger mounted in said turret and having a can supporting shelf projecting therefrom, said finger being moved by cans at the lower weighing level into a non-supporting position but engaging its said shelf under cans at a predetermined level above said lower level for supporting the can at its received level during removal from its scale unit and during passage of the supported can to the discharge means corresponding to the level of the supported can to segregate cans of different weights one from the other.

2. In a can weighing and sorting machine, the combination of a scale unit having free vertical movement to assume relative vertical positions at different levels according to the weight of a can received thereon, a rotatable discharge turret disposed adjacent said scale unit and having feed fingers for removing the weighed can therefrom at different levels, a plurality of discharge means disposed adjacent said turret and located at different levels for receiving the weighed cans from said turret, a plurality of support fingers mounted in said turret one adjacent each of said feed fingers, yieldable means in said turret and pressing said support fingers outwardly beyond said turret, stop means in said turret for limiting the outward projection of said support fingers, and a can supporting shelf on each of said support fingers and engageable under cans at a predetermined level above said lowest level for supporting the can at its received level during removal from its scale unit and for carrying the supported can to the discharge means corresponding to the level of the supported can to segregate cans of different weights one from the other.

3. In a can weighing and sorting machine, the combination of a scale unit having free vertical movement to assume one of a plurality of vertically spaced weighing positions according to the weight of a can received thereon, a rotatable discharge turret disposed adjacent said scale unit for removing weighed cans from said scale unit as light weight and normal weight cans, a plurality of discharge means disposed adjacent said turret and located at weighing levels corresponding to an upper lightweight level and a lower normal weight level, said discharge means respectively receiving light weight and normal weight cans from said turret, and support means movable with said turret and engageable beneath a light weight can at said upper level for supporting such can during its removal from its scale unit, said turret and said support means carrying the supported light weight can over said lower level-discharge means to said upper level discharge means to segregate cans of light weight from cans of normal weight.

4. In a can weighing and sorting machine, the combination of a scale unit having free vertical movement to assume relative vertical positions at different levels in accordance with the determined weight of a can received thereon as of light or normal weight, a rotatable discharge turrent disposed adjacent said scale unit for removing the weighed can from said scale unit at either of said levels, a plurality of discharge means disposed adjacent said turret at vertically spaced levels corresponding to said upper light weight and lower normal weight weighing levels, said discharge means respectively receiving light and normal weight cans from said turret, and a support finger pivotally mounted in said turret, said finger projecting from the turret and engageable beneath a light weight can at said upper level to support such can during its removal from said scale unit, said turrent and said finger advancing the supported can to a discharge means, a weighed can of normal weight at said lower level engaging and retracting said finger from projecting supporting position so that said turret carries such normal weight can into another discharge means disposed beneath the first discharge means to segregate cans of light and normal weights from each other.

5. In a can weighing and sorting machine, the combination of a scale unit having free vertical movement into a weighing level according to the weight of a can received thereon, means operative on said scale unit after weighing for moving the unit and its can into an upper level for a light weight can and into a lower level for a normal weight can, means disposed adjacent said scale unit for locking the unit against vertical movement at one of said levels, a rotatable discharge turret disposed adjacent said scale unit for removing the weighed can from its locked scale unit at either of said levels, a pair of discharge runways disposed adjacent said turret and extending in different directions and located respectively at said upper and lower levels for selectively receiving the weighed can from said turret, and support means housed in said turret at the higher of said two levels and engageable under a light weight can at said higher level for supporting said light weight can during its removal from said scale unit, said turret and said support means advancing the supported light weight can to said upper level discharge runway to segregate the can from normal weight cans discharged by said turret into said lower level runway.

6. In a can weighing and sorting machine, the combination of a scale unit having free vertical movement to assume relative vertical positions at different levels according to the weight of a can received thereon, means disposed adjacent said scale unit for locking it against vertical movement at one of said levels as determined by the position assumed by the can during weighing, a rotatable discharge turret disposed adjacent said scale unit for removing the weighed can from its locked scale unit at either of said levels, a pair of discharge runways disposed in vertically spaced relation adjacent said turret and respectively extending in different directions from said upper and lower levels, said upper level discharge runway receiving weighed elevated light weight cans from said turret and said lower level discharge runway receiving weighed depressed normal weight cans from said turret, support means movably housed in said turret at said upper level and engageable beneath a light weight can for supporting the same during its removal from said scale unit and for directing such light weight can into said higher level discharge runway to segregate the light weight can from normal weight cans discharged by said turret into the lower of said runways, and means in the higher of said runways and engageable under the top edge of said supported light weight can for cooperatively supporting such can during its transfer from said turret into said upper level runway.

7. In a can weighing and sorting machine, the combination of an endless conveyor, a plurality of scale units carried by said conveyor for weighing said cans, a stationary cam track having communicating wide and narrow portions located adjacent said conveyor, a cam roller carried by said scale unit and having free vertical movement in the wide portion of said cam track to position the scale unit in one of vertically spaced positions according to the weight of a can received thereon, a divider rail in said cam track for selectively moving said scale units after a weighing operation into an elevated light weight can position and into a depressed normal weight can position, means for locking said scale units with their weighed cans at said vertically spaced positions in accordance with the position assumed by the cans during weighing, a rotatable discharge turret disposed adjacent the path of travel of said conveyor for removing the weighed elevated and depressed cans from said locked scale units at said vertically spaced positions, a pair of discharge means disposed adjacent said turret in vertically spaced relation corresponding to the vertically spaced positions of said locked scale units, said discharge means respectively receiving the elevated and depressed cans from said turret, and support means movably housed in said turret and engageable beneath the elevated light weight cans for supporting the same during their removal from said scale units and for directing the supported light weight cans to said elevated discharge means to segregate cans of light and normal weights from each other.

8. A can weighing and sorting machine, comprising an endless movable conveyor having a plurality of spaced scale units thereon mounted for free vertical movement to assume relative vertical positions at high and low levels in accordance with the weight of single cans received thereon, means for individually feeding cans to said units for weighing operations thereby during advancement of said conveyor to a discharge station, means for locking said scale units at said high level for light weight cans and at said low level for normal weight cans after the weighing operation and prior to reception of said units at said station, a rotatable turret at said station having vertically spaced radial fingers thereon for engaging and discharging both light and normal weight cans from said units at said high and low levels respectively, vertically spaced discharge members adjacent said turret for respectively receiving the high level light weight cans and low level normal weight cans from said turret, and a plurality of circumferentially spaced support members carried by and having means for normally projecting the same from said turret adjacent said turret fingers for engaging beneath the elevated light weight cans to support the same during their advancement by said turret fingers from said scale units to the upper of said discharge members, said normally projecting light weight can support members being engaged by the depressed normal weight cans and retracted radially of the turret to permit such normal weight cans to be advanced by the turret fingers into the lower of said discharge members.

GEORGE M. STONE.

REFERENCES CITED

The following references are of record in the file of this patent:

UNITED STATES PATENTS

| Number | Name | Date |
|---|---|---|
| 2,086,103 | Thompson | July 6, 1937 |
| 2,092,109 | Dodge | Sept. 7, 1937 |
| 2,098,260 | Smith | Nov. 9, 1937 |
| 2,266,807 | Rooney | Dec. 23, 1941 |
| 2,385,882 | Rolker | Oct. 2, 1945 |